US005976389A

United States Patent [19]

Zavos

[11] Patent Number: 5,976,389

[45] **Date of Patent: *Nov. 2, 1999**

[54] METHOD OF SEMEN FILTRATION

[76] Inventor: Panayiotis M. Zavos, 2413 Vince Rd., Nicholasville, Ky. 40356-9343

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,539

[22] Filed: Mar. 13, 1997

Related U.S. Application Data

[63] Continuation of application No. 08/096,734, Jul. 23, 1993, abandoned, which is a continuation of application No. 07/839,042, Feb. 18, 1992, abandoned, which is a continuation of application No. 07/701,320, May 16, 1991, abandoned, which is a continuation of application No. 07/291,960, Dec. 30, 1988, abandoned.

[51] Int. Cl.$^6$ .................................................... B01D 37/00

[52] U.S. Cl. ............................................................ 210/807

[58] Field of Search .................................... 210/266, 282, 210/807; 604/349

[56] References Cited

U.S. PATENT DOCUMENTS

| | | | |
|---|---|---|---|
| 4,151,254 | 4/1979 | Gimovsky | 210/282 |
| 4,244,694 | 1/1981 | Farina et al. | 210/198.1 |
| 4,430,229 | 2/1984 | Yamawaki et al. | 210/263 |
| 4,690,678 | 9/1987 | Douglas-Hamilton | 604/349 |

*Primary Examiner*—Ivars Cintins
*Attorney, Agent, or Firm*—John L. Sigalos

[57] ABSTRACT

There is disclosed a method of filtering semen comprising admixing Sephadex beads of about 40 to 120 microns in diameter in the column of a semen filtering device having openings at both ends with a media, permitting the beads to hydrate, expand, and settle in the column to form a multi-layer filter having passages of predetermined sizes therebetween permitting passage therethrough of motile spermatozoa, adding to the multi-layer filter a washed semen specimen suspended in a liquid media suitable for use with semen, and recovering the semen that pass through the filter.

2 Claims, 1 Drawing Sheet

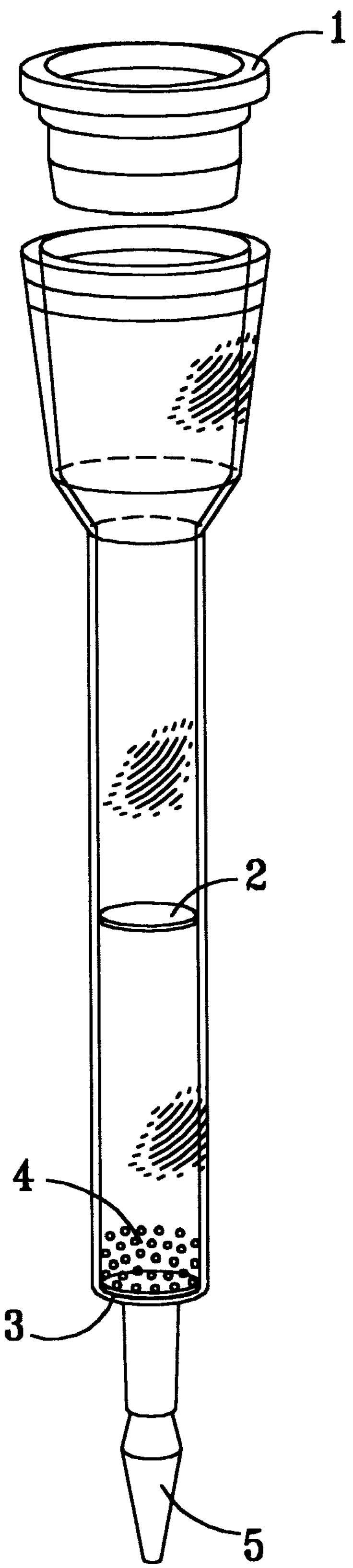
1
2
4
3
5

METHOD OF SEMEN FILTRATION

REFERENCES TO RELATED APPLICATIONS

This application is a continuation of application Ser. No. 08/096,734, filed Jul. 23,1993, now abandoned, which is a continuation of application Ser. No. 07/839,042, filed Feb. 18, 1992, now abandoned, which is a continuation of Ser. No. 07/701,320, filed May 05, 1991, now abandoned, which is a continuation of Ser. No. 07/291,960, filed Dec. 30, 1988.

BACKGROUND OF THE INVENTION

1. Field of the Invention

This invention relates to a particular method of processing semen and filtering it through a filtration column for the purpose of selectively increasing the number of motile and morphologically normal spermatozoa in the filtrate. The column contains a filter device comprised of a disc made of standard insulate and numerous dehydrated Sephadex (a dry soluble powder composed of microscopic beads which are synthetic, organic compounds derived from the polysaccharides dextran) beads, 40 to 120 microns in diameter, that lay on top of the insulate disc. When hydrated with standard laboratory media, the beads expand and settle, forming a multi-layer filter.

2. Description of the Related Art

Several methods have been proposed wherein semen can be processed to increase the quality and quantity of the spermatozoa population in a semen sample, thereby increasing the probability of success when the semen sample is used for Artificial Insemination (AI), In Vitro Fertilization (IVF), and related clinical techniques. Among these methods are washing and storing spermatozoa in media, and the "rise" or "swim up" procedure, a technique that takes advantage of the swimming abilities of a small percentage of spermatozoa within a population. See e.g. Russell and Rogers, J. Androl., 8:25–33, 1987.

None of these methods are simple and short and all of them are susceptible to technician error and accident. However, these disadvantages are overcome by the present invention, which provides for a simple apparatus and procedure that enhances normal morphologic spermatozoa forms and increases the number of motile spermatozoa. Semen that is processed and filtered in accordance with this invention demonstrates qualitative and quantitative spermatozoa characteristics that are as good or better than any other semen processing method. Data from tests made on the procedure and apparatus claimed in this invention are set forth in Table 1, which is attached hereto.

SUMMARY OF THE INVENTION AND OBJECTS

The present invention is a sterile, non-hydrated, disposable non-spermicidal filtration column to be manufactured in accordance with strict quality controls, packaged in sterile wrapping, and made available for wide distribution to clinical locations. It consists of a disposable column, a top stopper, a removable, nonporous upper disc situated horizontally across the column approximately two-thirds from the top, a bottom non-spermicidal filter disc made of standard insulate material that allows for the free flow of elements less than 50 to 100 microns in size, numerous dehydrated non-spermicidal beads, 40 to 120 microns in diameter, that lay on top of the insulate disc, and a reuseable bottom closure cap. The device is used to filter spermatozoa after it has been prepared for filtration in accordance with a semen processing method that is part of the invention.

It is the primary object of the present invention to provide a method and apparatus by which to process semen and filter spermatozoa for the purpose of selectively increasing the normal morphology, motility, sperm concentration, and fertilization potential of semen samples for use in AI and related clinical techniques.

A second object of the present invention is to provide a simple method and apparatus by which to filtrate spermatozoa that is easily and quickly accomplished with good repeatability and with little likelihood of technician error or accident.

A third object is to provide a sterile, non-hydrated, disposable filtration column that can be manufactured and distributed widely to clinical locations, where it can be hydrated and used with relative ease.

BRIEF DESCRIPTION OF THE DRAWING

FIG. 1 is a lateral perspective of the present invention.

DESCRIPTION OF THE ILLUSTRATIVE EMBODIMENT

FIG. 1 depicts generally the present invention, which includes a top stopper (1), a nonporous upper disc (2) located horizontally across the column approximately two-thirds of the column height from the top, a lower disc (3) made of standard insulate material that allows for the free flow of elements less than 50 to 100 microns in size, numerous dehydrated Sephadex beads (4), 40 to 120 microns in diameter, that lie on top of the insulate disc, and a reuseable bottom closure cap (5).

Use of the present invention involves two major steps:

(A) Mixing and washing the semen in order to prepare the spermatozoa for filtration; and (B) Filtering the spermatozoa through the Semen Filter Column.

The spermatozoa are prepared for filtration by obtaining a freshly ejaculated and liquified semen specimen and evaluating it for volume, sperm count per milliliter, motility and presence of debris. These findings should be noted for later reference. Next, the semen specimen is diluted in a media. Any standard laboratory media accepted in the literature for use with human semen is acceptable. The liquid should be mixed gently and centrifuged at 400 g for 6 minutes. The supernatant is then removed and discarded. The resulting sperm pellet is resuspended in media to a final concentration of $100\times10^6$ sperm/milliliter. With the mixing and washing of the semen complete, the spermatozoa is now ready for filtration.

Prior to or at the beginning of semen preparation, a Semen Filter Column (SFC) should be removed from its sterile package. One or more SFCs may be needed per ejaculate to be processed. At this same time, a 15 ml. test tube should be placed upright in a 37 degree centigrade water bath.

Holding the SFC upright and with the bottom closure cap in place, the top stopper should be removed and 3.0 ml. of media placed into the SFC. The media should be at room temperature. The media will flow onto the nonporous upper disc, which should then be gently removed by nudging it with a pipette so as to push the disc against the walls of the SFC, and pulling it upward. The media can now drip down the column and mix with the dehydrated Sephadex beads on the lower insulate disc. A Pasteur pipette should be used to mix the beads with the media and remove any air bubbles that may exist or have formed in the bottom of the SFC. Caution should be taken not to disturb the bottom disc.

Once the media has begun mixing with the dry beads, five minutes or more should be allowed for the beads to expand and settle thereby forming a multi-layer filter permeable to liquids at atmospheric pressure on the insulate disc, the filter having passages of predetermined sizes between the beads permitting passage therethrough of motile spermatozoa. Next, remove the bottom cap from the SFC in order to allow two to three drops of media to drip through the bottom opening. The opening is quickly closed with the bottom closure cap and the SFC is placed into the 37 degree centigrade water bath until the semen is ready for filtration.

When ready to start the actual filtration, remove the SFC from the water bath. If the initial evaluation of the semen showed little or no debris and motility greater than 50%, place 0.75 ml. of the well mixed-washed semen preparation into the top of the SFC. If, however, debris is excessive and motility is less than 50%, only 0.5 ml. of the semen preparation should be placed into the SFC.

Once the semen preparation is in the filtration column, the bottom closure cap should be removed and the SFC placed into the 15 ml. test tube so that as the filtrate flows through the SFC it can be collected in the test tube. The semen preparation should be filtered for 15 minutes, with more media periodically being added to the SFC in order to maintain the media at its original 3.0 ml. level. Occasionally during filtration, it may be necessary to aspirate media from the SFC using a pipette and then expirating it directly onto the top of the filter beads so as to prevent the build up of a film of dead sperm and debris which could block or interfere with proper flow of filtrate.

When filtration is complete, remove the SFC from the test tube and replace the bottom closure cap. Pull the filtrate from the test tube, centrifuge it, and reconstitute the spermatozoa at the desired level of dilution in a buffer of choice. The level of sperm dilution, or the sperm concentration in the resuspended preparation, shall be determined by the clinical purpose that the spermatozoa will be used for. For example, the filtered spermatozoa may be used for In Vitro Fertilization (IVF), Artificial Insemination (AI), Intrauterine Insemination (AIH-IU), Gamete Intrafollopian Transfer (GIFT) and other clinical techniques. Prior to actual use of the filtered-resuspended semen specimen, it should be assessed for sperm count per milliliter, motility, the presence of debris and other parameters routinely used in semenology. The filtered spermatozoa are now ready for use.

TABLE 1

Qualitative and quantitative characteristics of spermatozoa before and after filtration recovered through the Sephadex filtration process, as well as, recovered via the swim-up procedure using human spermatozoa

| | Qualitative - Quantitative Sperm Characteristics (N = 12) | | | | | |
|---|---|---|---|---|---|---|
| | Motility (%) | Grade (0–4) | Morphology (% Normal) | Acrosomes (% Normal) | Debri Presence[2] (Subjective) | Sperm Recovered ($\times 10^6$/ml) |
| Before filtration | 57.6 ± 5.1 | 3.1 ± 0.6 | 61.3 ± 7.0 | 57.4 ± 7.1 | 3.0 ± 0.9 | 78.3 ± 9.1 |
| After filtration | 84.7 ± | 3.7 ± 0.4 | 87.4 ± 4.1 | 88.3 ± 5.1 | 0.8 ± 0.1 | 31.2 ± 5.3 |
| Swim-up[3] | 86.1 ± | 3.7 ± 0.5 | 82.4 ± 5.2 | 81.0 ± 6.2 | 0.7 ± 0.1 | 17.1 ± 4.4 |

[1]According to Zavos and Cohen, Fertil. Steril., 1980.
[2]Subjective evaluation; 0 = complete absence; 4 = severe. (Cohen et al., 1985).
[3]According to Cohen et al., Fertil. Steril., 1985.

What I claim is:

1. The method of filtering semen comprising admixing a dry soluble powder composed of microscopic beads which are about 40 to 120 microns in diameter and which are synthetic, organic compounds derived from the polysaccharide dextran with an aqueous media in a column of a semen filtering device having openings at both ends, permitting said dry soluble powder to hydrate, expand, and settle in said column to form a multi-layer filter having passages of predetermined sizes therebetween permitting passage therethrough of motile spermatozoa, passing through said multi-layer filter a washed semen specimen suspended in a liquid media suitable for use with semen, and recovering the semen that pass through the filter.

2. The method of claim 1 wherein the concentration of sperm in the liquid media prior to filtration is about $100\times10^6$ sperm/milliliter.

* * * * *